United States Patent Office 3,031,315
Patented Apr. 24, 1962

3,031,315
PROCESS FOR PREPARING STERILIZED CONCENTRATED MILK PRODUCTS
Abraham Leviton, Washington, D.C., and Michael J. Pallansch, Vienna, Va., assignors to the United States of America as represented by the Secretary of Agriculture
No Drawing. Filed Aug. 24, 1960, Ser. No. 53,597
14 Claims. (Cl. 99—215)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for preparing concentrated milk products, and particularly relates to a process for preparing concentrated milk products with improved heat stability and storage life.

Sterile concentrated milk products such as evaporated milk are ordinarily prepared by concentrating normal or modified fluid milk to produce a concentrate of the desired content of total solids and the desired ratio between fat and total solids, preferably homogenizing at some point in the preparation of the concentrate, packaging the concentrate in cans or bottles, and sterilizing the packaged concentrate with heat.

There are well-recognized liabilities in the sterile milk products prepared by previously developed processes. It is known that the use of high temperatures and short times of sterilization results in sufficient destruction of contaminating organisms without the unwanted side-effects of imparting off-color and off-flavors and of heat coagulation which may occur with the long heating period required if lower sterilizing temperatures are used. However, use of the high temperature-short time (HTST) method introduces the undesirable side effect of gel formation during storage of the product prepared by this method.

Gelling manifests itself in a characteristic manner. A storage period in which viscosity usually decreases is followed by one in which viscosity remains fairly steady. Finally, a period is observed in which the viscosity rises, slowly at first, then more rapidly, until the concentrated milk, instead of flowing freely, begins to move as a body possessing a liver-like consistency. The soft body gradually gives way to a firm one, inhomogeneities appear and syneresis (exudation of milk serum) may be observed.

An object of the present invention is to produce a packaged sterile concentrated milk product which is stable in storage for long periods of time against gel formation and stratification. Other objects and a fuller understanding of the invention may be had by referring to the following description and claims.

In general, according to the present invention about from 0.05 to 0.2%, based on dry weight solids in the concentrated milk, of manganese in the form of a water soluble, non-toxic, divalent salt, such as manganous sulfate, is thoroughly dispersed in a concentrated milk product. The concentrated milk product containing the additive is then packaged and sterilized by the HTST method. Sterilized concentrated milk products containing the manganous salt have markedly improved storage life over products which are exactly the same with the exception that no manganous salt was added. The improvement in storage life of sterilized concentrated milk products prepared using the HTST method of sterilization is particularly advantageous because these products, limited by conventional "long-hold" procedures to about 27% whole milk solids or about 19% skim milk solids, may now contain an additional 50% milk solids without serious side-effects.

The method of sterilizing at about 280° F. (137° C.) with a holding period of about 5 to 15 seconds, packaging before or after sterilization, is an example of the high temperature-short time (HTST) method. While the use of slightly lower temperatures with slightly longer holding times also falls into the category of an HTST method, an important consideration in all HTST methods is rapid heating to desired temperature and rapid cooling after sterilizing. Equipment being available, better control is obtained by sterilizing, cooling, and then packaging by aseptic procedures.

In a preferred embodiment of the present invention the step of adding the divalent manganese salt is combined with steps for making the optimum quality HTST sterilized concentrated milk product, these steps including forewarming the milk, concentrating the forewarmed milk, homogenizing the concentrated milk and sterilizing by the HTST method.

While we prefer to disperse an aqueous solution of the manganese salt in the concentrated milk, the particular means of combining the salt with the milk and the time at which this combination is performed is considered to be optional as long as good distribution of the manganese throughout the concentrated product is achieved. Although it is preferred to add the manganous salt prior to sterilization, it may be desirable at times to modify the process by changing the order of the steps. Manganous salts in sufficiently high concentrations added to concentrated milk before sterilization conduce to a thickening of the milk concentrate during sterilization (see Table I) which with some heat-labile milks may reach undesirable proportions. To obviate this condition, other courses of action are available. For example, the manganous salt in sterile aqueous solution is added to such milks after concentration and sterilization; or the milk is concentrated after sterilization, in which case the manganous salt is added to the milk as the initial step before processing. It will be obvious that the foregoing modifications may be carried out without departing from the spirit of the invention. In the example which follows, a significantly improved product is obtained even without the step of homogenizing the concentrated milk.

Although an advantage accrues to the use of higher concentrations of added manganese, an upper limit of about 5.6 grams manganous sulfate (about 2.0 grams manganese) per kilogram of milk solids-not-fat has been selected in order to conform to the concentration limits imposed by law on the use of stabilizing salts in evaporated milk.

In demonstrating the present invention a storage temperature of 30° C. was selected, and viscosity measurements were made at this temperature. The improvement in stability of the products is considered as applicable to all storage conditions.

The storage life of a sample is taken as the time required for the "stirred-out" viscosity to reach a value which is twice the minimum viscosity observed during storage. The "stirred-out" viscosity is defined as the viscosity of a sample after the position of the sample in a capillary tube has been reversed twice by the application of centrifugal force.

The practice of this invention is illustrated by the following example.

EXAMPLE 1

Skim milk containing 9.23% solids was forewarmed at about 100° C. for 17 minutes. The forwarmed milk was concentrated in vacuo to contain 31.1% solids. To aliquots of this concentrate were added sufficient quantities of a water solution of manganous sulfate and/or distilled water to give four concentrates containing 28.3% skim milk solids and, respectively, 0, 1.35, 2.70 and 5.40 grams manganous sulfate per kilogram milk solids. Each of the aliquots was intimately mixed to distribute the manganese uniformly throughout the aliquots which contained added salt and to provide uniform distribution of milk solids in all aliquots.

Viscosity measurements were made in bomb microviscometers fabricated from thin-walled capillary tubing and containing a small glass bead within the tubing. For each aliquot a sample was introduced into a bomb microviscometer and a viscosity determination made without sterilization. Groups of similar microviscometers were loaded, sealed, sterilized at 280° F. (137.4° C.) for 5 seconds, cooled to room temperature, and stored at 30° C. During storage the samples were turned occasionally to retard sedimentation. Viscosity ("stirred-out") measurements, determined at 30° C. with the viscometers inclined at an angle of approximately 10° to the vertical, were made periodically, measuring the time of transit of the glass bead between two marks on the microviscometer, the results calculated as centipoises, and recorded as in Table I.

The data in Table I show conclusively that the storage life of the packaged sterilized concentrated milk is increased by the addition of manganese salts, and that the increase is furthered by each additional increment of manganese salt. According to the criterion of storage life used in these tests, the storage life of the concentrate containing no additive comes to an end after 14 days' storage, that of the concentrate containing about 1.4 grams manganous sulfate per kilogram of milk solids-not-fat (0.05% manganese dry weight basis) comes to an end after 26 days of storage, and the storage life of concentrates containing 2.7 and 5.4 grams manganous sulfate per kilogram of milk solids-not-fat had not been reached after 50 days' storage.

*Table 1*

STORAGE LIFE OF SKIM MILK CONCENTRATES (28.3% MILK SOLIDS) WITH AND WITHOUT ADDED MANGANOUS SULFATE

| Concentration of Manganous Sulfate, g. per kg. solids-not-fat | Viscosity Before Sterilization,[1] centipoises | Viscosity After Sterilization,[2] centipoises | Minimum Viscosity During Storage, centipoises | Storage Life,[3] days |
| --- | --- | --- | --- | --- |
| 0 | 9.0 | 14.3 | 10.1 | 14 |
| 1.35 | 8.4 | 13.8 | 9.9 | 26 |
| 2.70 | 8.0 | 15.6 | 10.6 | >50 |
| 5.40 | 7.6 | 49.0 | 15.3 | >50 |

[1] All viscosity measurements at 30° C.
[2] Concentrate sterilized by heating at 280° F. for 5 seconds.
[3] Samples stored at 30° C.

The inventive process, illustrated in Example 1 with improvement of storage life of sterlized concentrated skim milk, is equally applicable to HTST sterilized concentrated whole milk products, including conventional concentrations and those with various proportions of fat content.

We claim:

1. A high temperature-short time sterilized concentrated milk product of improved storage stability comprising a high temperature-short time sterilized concentrated milk having incorporated therein about from 0.05 to 0.2%, based on dry weight of milk solids, of manganese in the form of a water soluble, non-toxic, divalent manganese salt.

2. The product of claim 1 wherein the manganese salt is manganous sulfate.

3. A process comprising forewarming a milk, concentrating the forewarmed milk, homogenizing the concentrated milk, dispersing in the homogenized concentrated milk about from 0.05 to 0.2% based on dry weight of milk solids, of manganese in the form of a water soluble, non-toxic, divalent manganese salt to give a concentrated milk product, sterilizing the concentrated milk product by a high temperature-short time method, and aseptically packaging the sterilized milk product to give a packaged sterilized concentrated milk product with improved storage stability.

4. The process of claim 3 wherein the manganese salt is manganese sulfate.

5. A process comprising forewarming a milk, concentrating the forewarmed milk, dispersing in the concentrated milk about form 0.05 to 0.2%, based on dry weight of milk solids, of manganese in the form of a water soluble, non-toxic, divalent manganese salt to give a concentrated milk product, homogenizing the concentrated milk product, sterilizing the homogenized concentrated milk product by a high temperature-short time method, and aseptically packaging the sterilized milk product to give a packaged sterilized concentrated milk product with improved storage stability.

6. The process of claim 5 in which the manganese salt is manganous sulfate.

7. A process comprising forewarming a skim milk, concentrating the forewarmed skim milk, dispersing in the concentrated skim milk about from 0.05 to 0.2%, based on dry weight of milk solids, of manganese in the form of a water soluble, non-toxic, divalent manganese salt to give a concentrated skim milk product, sterilizing the concentrated skim milk product by a high temperature-short time method, and aseptically packaging the sterilized skim milk product to give a packaged sterilizedz concentrated skim milk product with improved storage stability.

8. The process of claim 7 in which the manganese salt is manganous sulfate.

9. A process comprising forewarming a milk, concentrating the forewarmed milk, homogenizing the concentrated milk, sterilizing the homogenized concentrated milk by a high temperature-short time method, aseptically dispersing in the sterilized concentrated milk about from 0.05 to 0.2%, based on dry weight of milk solids, of manganese in the form of a sterile aqueous solution of a non-toxic, divalent manganese salt, and aseptically packaging the sterilized concentrated milk containing the manganese salt to give a packaged sterilized concentrated milk product with improved storage stability.

10. The process of claim 9 in which the manganese salt is manganous sulfate.

11. A process comprising dispersing in a milk about from 0.05 to 0.2%, based on dry weight of milk solids, of manganese in the form of a water soluble, non-toxic, divalent manganese salt, then forewarming the resulting milk product, sterilizing the forewarmed milk product by a high temperature-short time method, aseptically homogenizing the sterilized milk product, aseptically concentrating the sterilized homogenized milk product, and aseptically packaging the concentrated milk product to give a packaged sterilized milk product with improved storage stability.

12. The process of claim 11 in which the manganese salt is manganous sulfate.

13. A process comprising forewarming a milk, dispersing in the forewarmed milk about from 0.05 to 0.2%, based on dry weight of milk solids, of manganese in the form of a water soluble, non-toxic, divalent manganese salt to give a forewarmed milk product, sterilizing the forewarmed milk product by a high temperature-short time method, aseptically homogenizing the sterilized milk product, aseptically concentrating the sterilized, homogenized milk product, and aseptically packaging the concentrated milk product to give a packaged sterilized concentrated milk product with improved storage stability.

14. The process of claim 13 in which the manganese salt is manganous sulfate.

References Cited in the file of this patent

UNITED STATES PATENTS

| 2,481,415 | Grindrod | Sept. 6, 1949 |
| 2,845,350 | Wilcox | July 29, 1958 |